Figure 1:
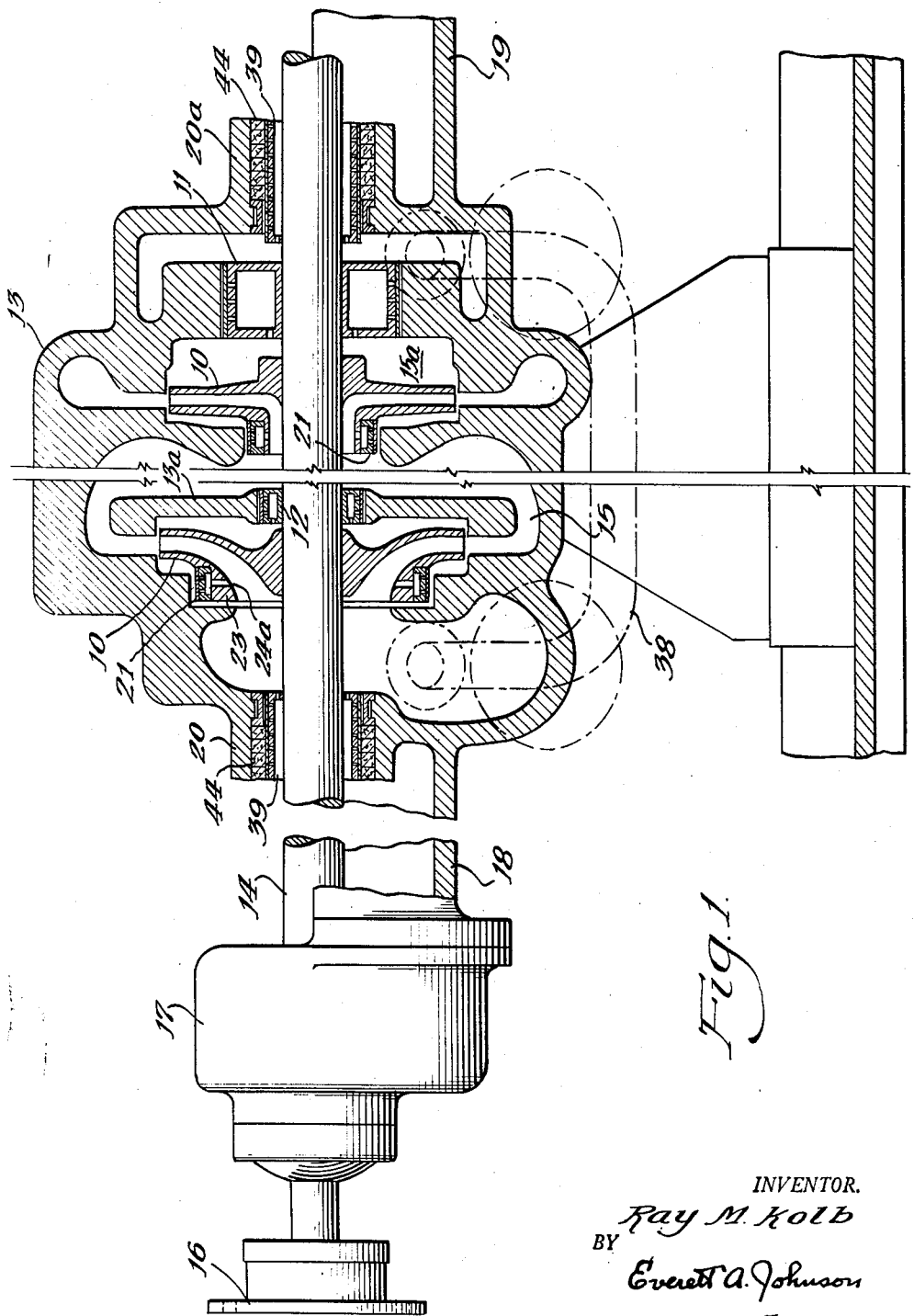

June 8, 1954  R. M. KOLB  2,680,410
SELF-LUBRICATED ROTATING SEAL FOR CENTRIFUGAL PUMPS
Filed Jan. 2, 1951  2 Sheets-Sheet 1

INVENTOR.
Ray M. Kolb
BY
Everett A. Johnson
Attorney

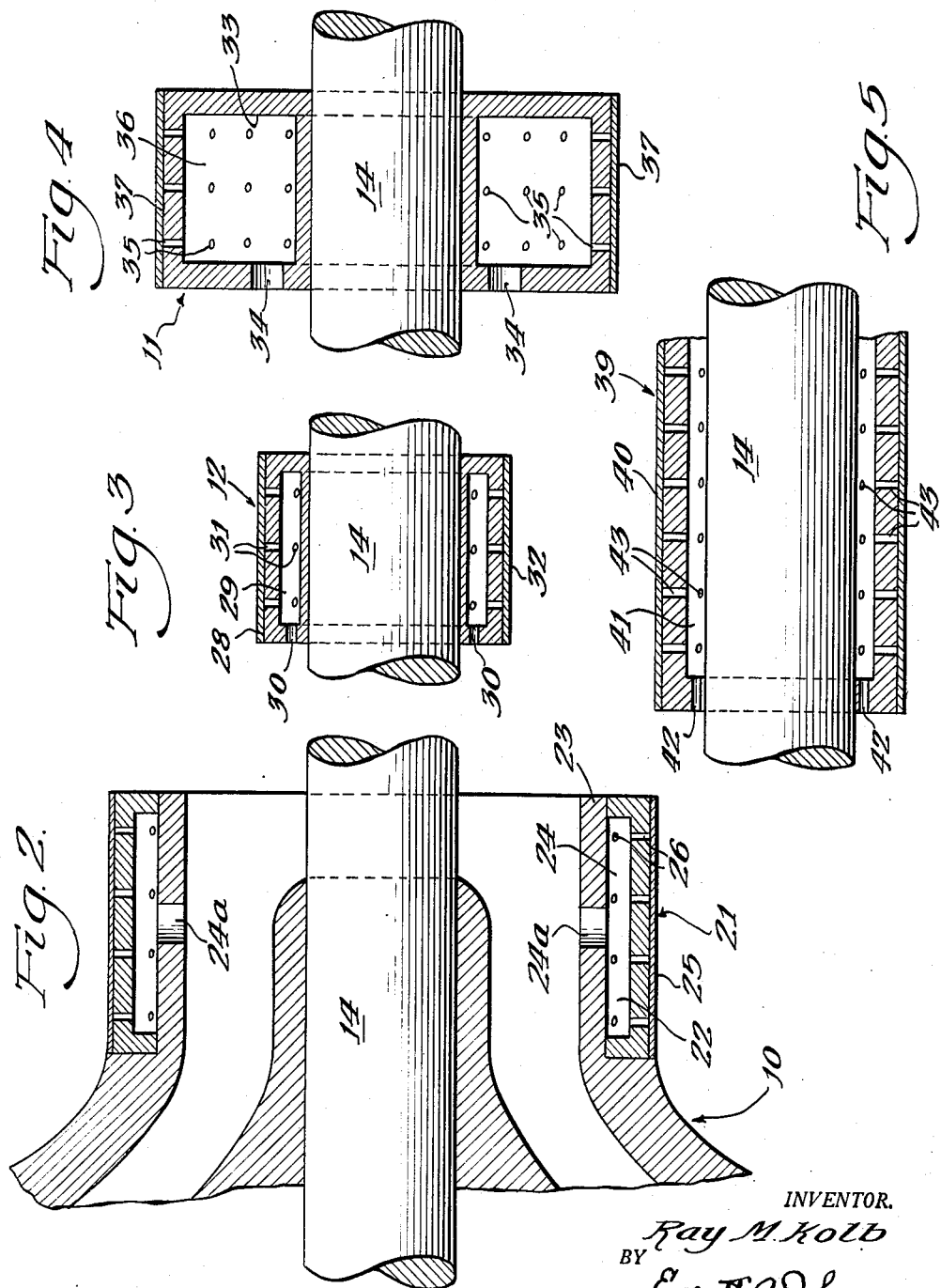

Patented June 8, 1954

2,680,410

UNITED STATES PATENT OFFICE 2,680,410

SELF-LUBRICATED ROTATING SEAL FOR CENTRIFUGAL PUMPS

Ray M. Kolb, Chicago, Ill., assignor to Standard Oil Company, Chicago, Ill., a corporation of Indiana Application January 2, 1951, Serial No. 203,835

8 Claims. (Cl. 103—111)

This invention relates to a sealing assembly and more particularly to an antifrictional seal for rotating elements such as shafts and impellers. More specifically the invention pertains to a seal for use in centrifugal pumps.

To operate at high efficiency, it is necessary to maintain internal leakage within a centrifugal pump at a minimum. This is done by close clearances wherever a seal is desired between differential pressures. Because of these close clearances a centrifugal pump must have fluid flowing through it at all times to act as a lubricant or it is in danger of seizure.

It is not always possible to determine immediately that fluid is not flowing uniformly through a centrifugal pump and frequently before the erratic operation of the pump is noticed and can be stopped the various seals in the pump which are operated at close tolerances have become overheated and seize. Such internal seizures of centrifugal pumps are common despite careful operating technique and often result in costly shutdowns of important units and in severe damage to the mechanical equipment.

Such seizures of centrifugal pumps frequently occur between the casing and the impeller wearing rings which form the seal between the impeller and the pump housing. These rings should have a clearance of not more than about 0.010 to 0.015 inch for the desired pumping efficiency but experience has indicated that it is necessary to increase the clearance to between 0.025 and 0.030 inch as a precaution against seizure.

Most multistage centrifugal pumps have an inherent axial unbalance and some type of balancing device is usually provided to counteract this force. The most common method employs a balancing drum which fits closely in the pump casing and is exposed to suction pressure on one side and discharge pressure on the other, this pressure differential causing the force which opposes the axial unbalance. A close fit of the drum in the casing is necessary for high pumping efficiency but frequently pump seizures occur at this point.

Another source of seizure is the close fit required between impeller spacers and the pump housing. This clearance is kept close to prevent interstage leakage but upon loss of suction seizure is likely to occur between the spacer and the housing.

It is therefore an object of this invention to provide a simple form of seal which is not subject to seizure upon loss of suction in a centrifugal pump. Another object of this invention is to provide a self-lubricating seal which assures continued lubrication for a time after suction has been lost. Still another object of the invention is to provide a simple and economical form of self-lubricating seal for shafts such as the shaft of a pump and the like. A further object of the invention is to provide a novel pump assembly which is not subject to seizure in the event that the flow of liquid through the pump is interrupted. These and other objects of the invention will become apparent as my description thereof proceeds.

Briefly according to my invention I provide a modified sealing surface construction wherein fluid can be trapped adjacent thereto during the periods of normal operation and expelled to provide lubrication between the surfaces in the event that the pump loses suction and the normal lubricant supply is interrupted. During the normal operation of the pump, however, there is a positive discharge of lubricant between the sealing surfaces and this acts to further reduce the clearance between the surfaces thereby improving the seal between the rotating elements. Accordingly, the pump efficiency is increased as well as safeguarded against mechanical seizure.

The sealing or wearing surface is provided with a porous outer surface below which is a chamber or fluid reservoir. Fluid inlet means communicate with the chamber to fill it with liquid while the pump is operating. A plurality of channels extend radially through the peripheral wall of the chamber and discharge into the porous surface. In the event that the pump loses suction, the fluid trapped in the chamber is forced by centrifugal pressure through the feed channels to the porous outer surface where it flows by capillarity between the surfaces forming the seal.

The invention will be better understood by reference to the following detailed description taken with the accompanying drawing wherein:

Figure 1 is an elevation showing the apparatus partly in section and in conjunction with a centrifugal multistage pump; and Figures 2, 3, 4 and 5 are vertical sections showing the details of construction as used in the pump of Figure 1.

In the accompanying drawing and more particularly in Figure 1 thereof, I have illustrated my novel sealing assemblies as applied to a centrifugal pump construction wherein the novel sealing element is applied to the impellers 10, the balancing drum 11, and the impeller spacer or interstage sleeve 12 between partitions 13a of the pump housing 13. The sleeve 12 may be fixed to the shaft 14 so as to abut the tapered faces of the hubs of the impellers 10. When so used they are referred to as impeller spacers and of course also function as interstage sleeves.

In the illustrated pump I provide a plurality of impellers 10 carried on pump shaft 14 driven through coupling 16 and supported in spaced bearing means 17 which are disposed on opposite ends of the pump case or housing 13. The bearing means 17 are supported in arms 18 and 19 of the housing 13. The housing or casing 13 is provided with a plurality of working compartments 15 and 15a, only two of which are illustrated in the drawing. At each end of the housing 13 are stuffing box housings 20 and 20a through which the shaft 14 operates. The pump impellers 10 are fixed upon the shaft 14 within the working compartments 15 and 15a and rotate with the shaft 14.

Referring to Figures 1 and 2, an impeller wear ring 21 is provided with a recess 22 which when pressed on the impeller hub 23 forms a reservoir chamber 24 having inlet port 24a in the hub 23. A porous sealing surface 25 is applied to the wearing ring either by metalizing or by sintered powder metallurgy. A plurality of feed channels 26 extend radially through the wear ring 21 and discharge to the porous sealing surface 25. Upon rotation, the liquid being pumped, such as an oil, is collected in reservoir chamber 24, and forced by centrifugal pressure from the chamber 24 through the feed channels 26 into the porous outer surface 25. This action is continuous during the operation of the pump and flow into the porous ring 25 is maintained even if the main supply of liquid in the pump 13 is interrupted.

In Figure 1 the impeller spacer 12 is secured to and rotates with the shaft 14 and the detailed construction of the impeller spacer 12 is shown in Figure 3. A sleeve 28 contains an annular reservoir chamber 29 having a plurality of fluid entrance channels 30 and a plurality of feed channels 31 which discharge into the porous surface 32. The channels 30 are preferably symmetrically arranged on the lateral or end face of the sleeve 28. Such a spacer 12 may be made of hardened steel or other metal and is tightly fitted to the shaft 14 as by shrinking thereon or given a drive fit thereover. The spacer 12 provides a seal between stages of the pump and its operation is similar to that described in connection with the wear ring 21.

The details of the balancing drum 11 are illustrated in Figure 4. It may comprise, for example, a hollow annular sleeve 33 constructed similarly to the corresponding element of impeller spacer 12 but having a reservoir chamber 36 of greater radial extent. Thus fluid entrance ports 34 in the lateral sides of the sleeve 33 and feed channels 35 in the peripheral wall of sleeve 33 communicate with the reservoir chamber 36, the fluid being ejected through feed channels 35 by centrifugal pressure into the porous surface 37. This drum 33 may be applied to the shaft 14 by shrink fit, by keys and ways, or may be fixed to the shaft by any other well known means. The balancing drum 11 is exposed to suction pressure on one side and discharge pressure on the other, and bypass line 38 provides communication between the inlet chamber 15 and the remote side 15b of the balancing drum 11.

Most pumps utilize a stuffing box and a conventional packing to prevent shaft leakage. In this type of arrangement, packing rings are forced between the packing housing and the shaft or a hard surfaced shaft sleeve threaded onto it to prevent leakage. This arrangement is capable of stopping completely any shaft leakage but when it does so no lubrication is present and the frictional heat results in early failure. Consequently it is common practice to permit a small leakage of fluid from the pumps or to supply gland oil from an outside source to provide lubrication. According to my invention, a shaft sleeve 39 shown in Figure 5 is provided with a porous outer surface 40 to lubricate the packing surface on a pump which is handling a fluid with good lubricating properties. The liquid enters the reservoir chamber 41 between the pump shaft 14 and the shaft sleeve 39 through fluid entrance ports 42 exposed to the fluid being pumped. This fluid passes from the chamber 41 through feed channels 43 to the porous surface 40 to lubricate the packing 44 surrounding the sleeve 39.

Thus far I have described embodiments of the invention wherein the porous surface is in the form of a cylinder or segment of a cylinder. It is also proposed that this type of system can be applied to a disc-shaped sealing ring. Thus the principle of a porous metal sealing member with a lubricant reservoir behind it, said reservoir being supplied by the liquid being handled, can be modified to provide radial sealing discs backed by the oil cavity. The seal face can be undercut and holes drilled to deliver fluid to the porous seal face. Ordinarily, the pressure of the fluid at the entrance holes is adequate to force it into the porous sealing discs. However, scoops or vanes for the liquid may be provided adjacent the fluid entrance ports to induce flow of the liquid into the reservoir chamber.

As indicated above the wearing ring is formed of a porous metal. The surface or ring is porous throughout and will absorb approximately 35 to 45 percent by volume of the lubricant liquid and has a permeability or free flow space which permits a flow by capillarity and by centrifugal force through the ring to the surface thereof. The sealing metal therefore may be described as a porous absorbent sponge-like metallic surface and is sometimes referred to herein simply as a porous ring or sleeve. The ring may comprise porous bronze, copper, tin, graphite and the like. It may be applied by powdered metal metallurgy and then heat treated. The porous surface may also be applied by the metalizing technique which is a widely used process for building up a porous surface with metal. Apparatus for metalizing is generally available and operates on the principle of melting the metal which is sprayed with a high velocity air stream against the surface to be built up. The surface produced in this manner is inherently porous and suitable for my purpose as a sealing or wearing ring.

Reverting to Figure 1, the drawing is schematic and many details of the pump housing 13, the bearing supports 17, the stuffing box housings 20 and the like have been omitted for simplicity since they do not form any part of the described invention, but it should be understood, however, that such accessories can be added by those skilled in the art in view of the description of my invention.

Although I have described my invention with references to specific apparatus which are set forth in some detail, it should be understood that these are by way of illustration only and that my invention is not necessarily limited thereto. For example, the broad principle illustrated by the described embodiments can be applied wherever there are close clearances dependent upon a pool of liquid for lubrication. Modifications in

I claim:

1. A lubricated seal adapted for use in a closely running fit with a casing comprising a rotatable porous metal ring, a ring support comprising an annular metal housing within and having a peripheral wall coaxial with said ring, a shaft coaxially supporting said annular housing, said ring support being rotatable with said shaft, port means in a wall of said housing adjacent said shaft, and perforations in the outer peripheral wall of said annular housing discharging into said porous ring upon rotation thereof whereby liquid is supplied from the housing to the ring to keep it impregnated with liquid.

2. In a seal for a shaft and the like adapted to be mounted in a casing, a sealing unit comprising a hollow annular housing fixed to the shaft and having a cylindrical outer wall rotatable with said shaft, a reservoir chamber in said housing, perforations in the said outer wall, a porous metal ring fixed to the exterior surface of said wall in a closely running fit with said casing, and a liquid inlet means to said reservoir chamber spaced radially inward from said outer wall.

3. A sealing apparatus adapted for use on a rotatable member in a housing including in combination a porous metal ring, an annular hollow support for said ring adapted to be fixed to a rotatable member, an annular chamber in said support adjacent said ring, an inlet duct in said support communicating with the said chamber and a discharge port means in the outer periphery of said support communicating with said porous metal ring, said ring being fixed to rotate with said support, whereby liquid is passed by centrifugal force from the chamber into said porous ring.

4. A pump structure comprising a porous metal sealing ring adapted for close running fit with a portion of said pump structure, means for supporting said ring on a rotatable element for rotation therewith, said supporting means comprising an annular metal housing having closed ends and mounted coaxial with the axis of rotation of said element for rotation therewith and with said porous ring, said housing providing a reservoir chamber, an inlet port to said chamber, and channels leading from said reservoir chamber through the outer peripheral wall of said housing to said ring whereby liquid passes through said channels from the chamber into the porous ring by centrifugal force when the rotatable element is in motion.

5. In combination a pump housing, a compartment in said housing, a shaft journaled in said housing, a hollow sleeve on said shaft, an outer cylindrical porous metal wearing surface carried by said sleeve and in close running fit with said housing, an inlet port communicating between said hollow sleeve and said compartment at a point spaced radially inward from said surface, and outlet port means in the outer periphery of said sleeve communicating with said porous surface whereby liquid introduced in said compartment by said inlet port is accumulated within said hollow sleeve and continuously discharged by centrifugal force therefrom into said porous metal surface when said shaft is rotated.

6. In a centrifugal pump wherein the impeller is mounted on a rotatable shaft, the improvement which comprises a balancing drum about said shaft having a peripheral surface which is in a closely running fit with the housing of said pump, a reservoir chamber within said drum, fluid entrance ports to said chamber in a side of said drum adjacent said shaft, feed holes in the outer peripheral surface of said drum communicating with said chamber, and a peripheral porous metal wearing ring carried by the outer peripheral surface of said drum whereby rotation of the balancing drum causes flow of oil by centrifugal force from said reservoir chamber into said porous metal surface through said feed holes.

7. A centrifugal pump for liquids comprising a casing having a working compartment, a shaft extending into said compartment, an impeller on said shaft within said compartment, a wearing ring secured on and rotating with said impeller, said wearing ring being in a closely running fit with said housing, an annular recess about the shank of said impeller accommodating said wearing ring, a reservoir chamber within said ring, a fluid entrance duct in said impeller communicating with said chamber and said working compartment, a plurality of feed holes in the outer peripheral wall of said chamber, and a porous wearing surface fixed to said ring whereby the liquid being pumped enters said reservoir chamber through said entrance duct and is expelled by centrifugal force from said chamber through the said holes into the porous metal surface.

8. In a centrifugal pump structure lubricated by the liquid being pumped, the improvement which comprises a porous metal wearing ring in a closely running fit with said structure, a hollow support for said ring, a pump shaft fixed to said support, said support comprising an annular housing which provides a liquid reservoir, liquid discharge channels in the outer periphery of said housing, a liquid inlet to said housing spaced inwardly from the outer periphery thereof and communicating with said liquid reservoir, said reservoir collecting liquid from the pump system during rotation of the said shaft and throwing the liquid centrifugally through said channels in the outer periphery of said housing into said porous metal ring to discharge the liquid by capillarity within the pores of the ring at the bearing surface thereof, said porous metal wearing ring being fixed for rotation with said hollow support, whereby the reservoir of liquid in the housing serves to continue the lubrication of the wearing ring in the event that the flow of liquid through the pump is interrupted.

References Cited in the file of this patent

UNITED STATES PATENTS

| Number | Name | Date |
| --- | --- | --- |
| 1,417,812 | Elmore | May 30, 1922 |
| 1,705,016 | Jack | Mar. 12, 1929 |
| 2,035,519 | Apple | Mar. 31, 1936 |
| 2,075,444 | Koehring | Mar. 30, 1937 |
| 2,162,486 | Le Tourneau | June 13, 1939 |
| 2,204,814 | Newell | June 18, 1940 |
| 2,265,953 | Mortensen | Dec. 9, 1941 |
| 2,366,629 | Kohler | Jan. 2, 1945 |
| 2,440,947 | Hart | May 4, 1948 |
| 2,465,930 | Robinson | Mar. 29, 1949 |
| 2,508,097 | Brown | May 16, 1950 |

FOREIGN PATENTS

| Number | Country | Date |
| --- | --- | --- |
| 566,045 | Great Britain | 1944 |